US010190355B2

(12) United States Patent
Bombardella et al.

(10) Patent No.: US 10,190,355 B2
(45) Date of Patent: Jan. 29, 2019

(54) WINDOW LIFTER

(71) Applicant: MAGNA STEYR Fahrzeugtechnik AG & Co KG, Graz (AT)

(72) Inventors: Andreas Bombardella, Graz (AT); Bernhard Geiger-Reinbacher, Hitzendorf (AT); Alexander Haselwanter, Graz (AT); Alois Mayrhofer, Graz (AT); Dirk Nellessen, Graz (AT); Daniele Rossio, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 111 days.

(21) Appl. No.: 15/388,114

(22) Filed: Dec. 22, 2016

(65) Prior Publication Data

US 2017/0314308 A1 Nov. 2, 2017

(30) Foreign Application Priority Data

May 2, 2016 (EP) ..................... 16167887

(51) Int. Cl.
| | |
|---|---|
| *E05F 15/689* | (2015.01) |
| *E05D 15/22* | (2006.01) |
| *E05F 15/60* | (2015.01) |
| *B60J 1/14* | (2006.01) |
| *B60J 1/17* | (2006.01) |
| *E05F 11/52* | (2006.01) |

(52) U.S. Cl.
CPC ............... *E05F 15/689* (2015.01); *B60J 1/14* (2013.01); *B60J 1/17* (2013.01); *E05D 15/22* (2013.01); *E05F 11/525* (2013.01); *E05F 15/60* (2015.01); *E05Y 2900/55* (2013.01)

(58) Field of Classification Search
CPC ...... E05D 15/22; E05F 15/689; E05F 11/525; E05F 11/689; E05F 11/382; E05F 11/385; E05F 11/405
See application file for complete search history.

(56) References Cited

U.S. PATENT DOCUMENTS

| | | | | |
|---|---|---|---|---|
| 3,062,528 | A * | 11/1962 | Martens | ................ E05F 11/405 49/227 |
| 4,089,134 | A | 5/1978 | Koike | |
| 4,575,967 | A * | 3/1986 | Bickerstaff | ................ B60J 1/17 49/211 |
| 4,730,414 | A * | 3/1988 | Nakamura | ............ E05F 11/382 49/348 |
| 4,785,582 | A * | 11/1988 | Tokue | .................. E05F 11/382 49/211 |
| 4,788,794 | A * | 12/1988 | Miller | ........................ B60J 1/17 49/211 |
| 5,009,461 | A * | 4/1991 | Smith-Horn | ............... B60J 1/14 296/146.2 |

(Continued)

FOREIGN PATENT DOCUMENTS

| | | |
|---|---|---|
| CN | 1621256 A | 6/2005 |
| DE | 10234100 A1 | 2/2004 |

(Continued)

*Primary Examiner* — Justin B Rephann
(74) *Attorney, Agent, or Firm* — Jordan IP Law, LLC; Todd A. Vaughn

(57) ABSTRACT

A window regulator for raising and lowering a windowpane in a motor vehicle, and a vehicle door having at least one window regulator.

16 Claims, 7 Drawing Sheets

(56) References Cited

U.S. PATENT DOCUMENTS

| | | | | |
|---|---|---|---|---|
| 5,142,824 A | * | 9/1992 | Le Compagnon | B60J 1/17 49/138 |
| 5,159,781 A | * | 11/1992 | Glossop, Jr. | B60J 1/17 49/375 |
| 6,283,534 B1 | * | 9/2001 | Mrozowski | E05F 11/525 296/146.2 |
| 6,560,930 B2 | * | 5/2003 | de Gaillard | B60J 1/1861 49/372 |
| 6,561,567 B2 | * | 5/2003 | Mrozowski | E05F 11/525 296/146.11 |
| 7,055,284 B2 | * | 6/2006 | Napoli | E05F 11/385 49/349 |
| 8,240,086 B2 | * | 8/2012 | Mangold | E05F 11/385 49/375 |
| 2002/0008404 A1 | * | 1/2002 | Mrozowski | E05F 11/525 296/146.2 |
| 2004/0187391 A1 | * | 9/2004 | Fenelon | E05F 11/385 49/375 |
| 2004/0237409 A1 | * | 12/2004 | Napoli | E05F 11/385 49/349 |

FOREIGN PATENT DOCUMENTS

| | | |
|---|---|---|
| FR | 2960509 A1 | 12/2011 |
| JP | 2014223821 A | 12/2014 |
| WO | 2005/108192 A1 | 11/2005 |

* cited by examiner

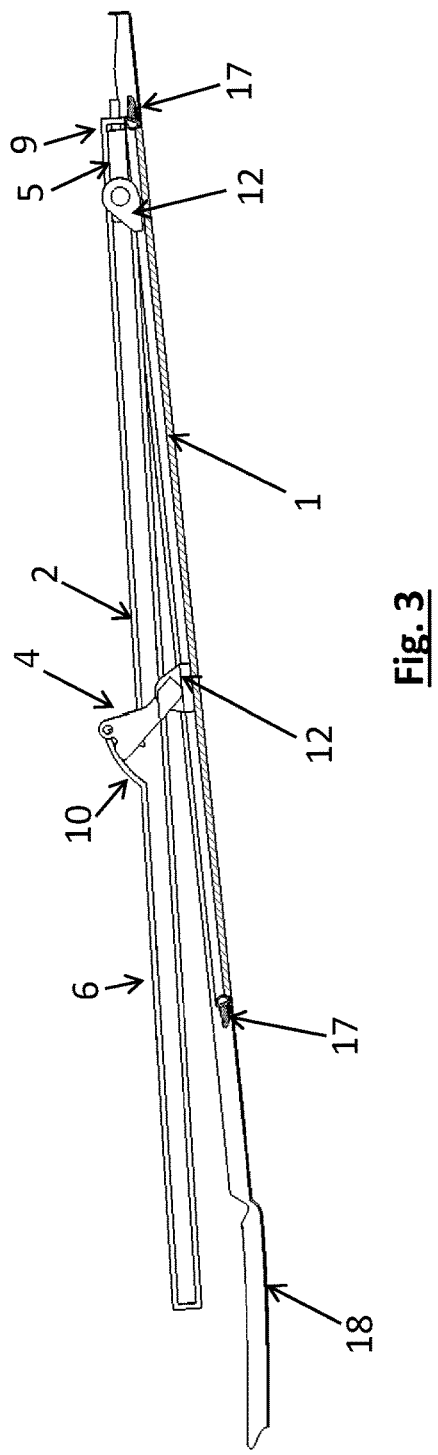
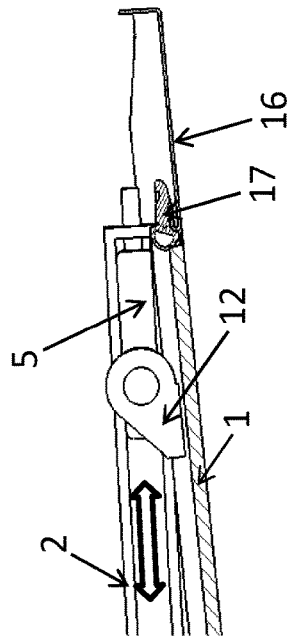
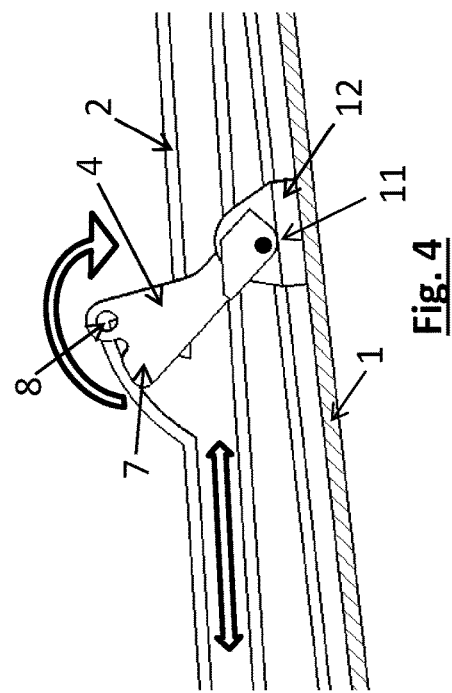
Fig. 3
Fig. 5
Fig. 4

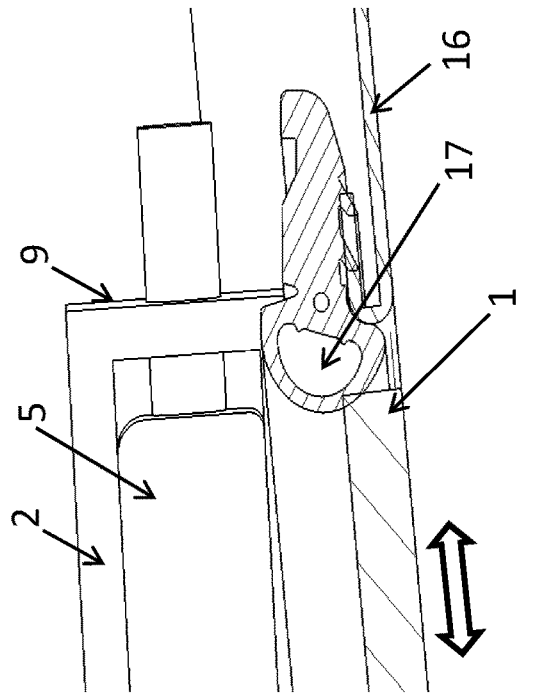
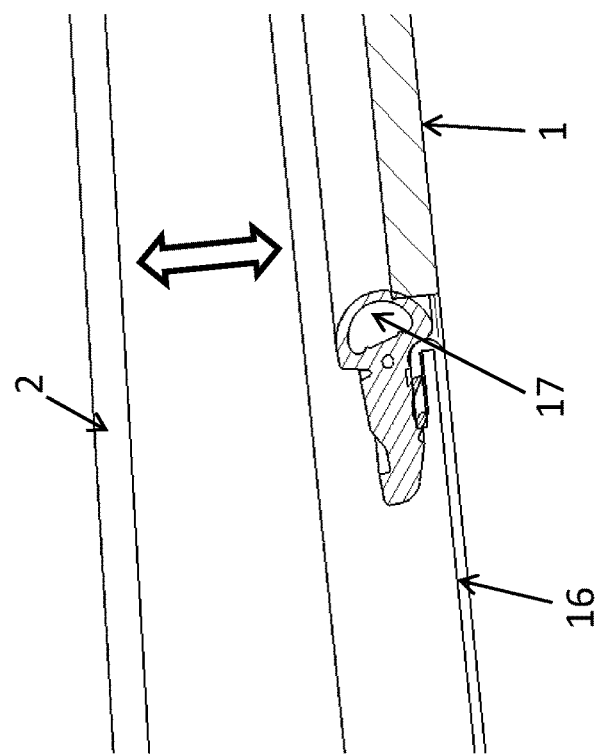

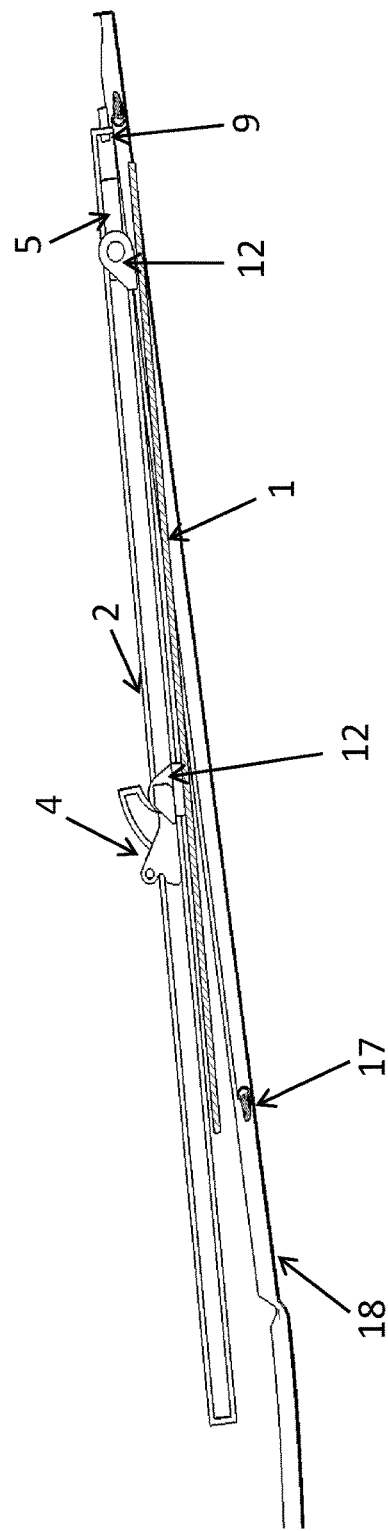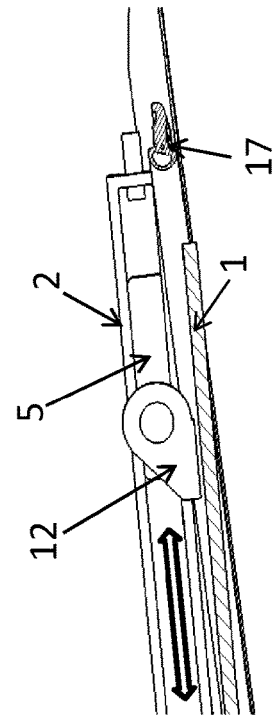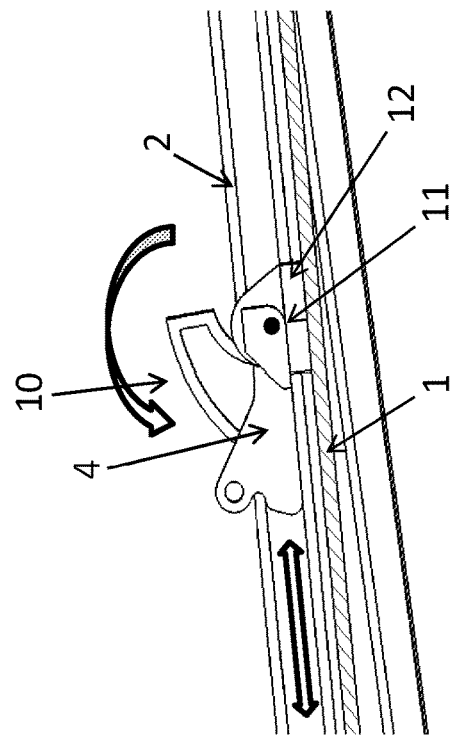

WINDOW LIFTER

CROSS-REFERENCE TO RELATED APPLICATIONS

The present application claims priority 35 U.S.C. § 119 to European Patent Publication No. EP 16167887.5 (filed on May 2, 2016), which is hereby incorporated by reference in its entirety.

TECHNICAL FIELD

Embodiments relate to a window regulator for raising and lowering a windowpane in a motor vehicle, and a vehicle door comprising at least one such window regulator.

BACKGROUND

Window regulators are particularly used on motor vehicle doors to open and close a vertical side windowpane or also on a tailgate to open and close a tailgate windowpane. The windowpanes in this case are customarily raised and lowered substantially linearly.

It is already known in the art that it may be advantageous for a windowpane to be flush with a window frame, particularly with a window opening or a seal, in the closed state, preferably flush with the outside of the vehicle, so that an enhanced visual impression results and the aerodynamic properties of the vehicle are enhanced. One advantage in this case is also the reduction in dirt on the windowpane. Windowpanes positioned flush in this manner produce a flush appearance.

A high contact pressure is required, however, particularly for the flush pressing of a windowpane against a seal at the end of a closing movement.

SUMMARY

A problem addressed by embodiments is that of specifying a window regulator which allows reliable, flush closing of a windowpane, and a vehicle door comprising a window regulator of this kind.

In accordance with embodiments, the problem is solved by a window regulator for raising and lowering a windowpane in a motor vehicle, and which comprises at least one of: at least one guide rail, a drive mechanism, a first guide element, and a second guide element, wherein the windowpane is to be fastened to the first guide element and the second guide element. The first guide element and the second guide element in the guide rail are guided substantially linearly in a linear guide section of the guide rail. The drive mechanism is connected at least to the first guide element. At least the first guide element is configured as a lever element.

In accordance with embodiments, the first guide element has a guide shaft on which the first guide element is conducted in the guide rail, and a linkage shaft spaced apart from the guide shaft, at which the drive mechanism is connected to the first guide element such that during a forced stop of the linear movement of the guide shaft in the guide rail and further drive via the drive mechanism, the first guide element performs a pivoting movement. In that way, the windowpane fastened to the first guide element executes a movement component perpendicularly to the linear guide in the guide rail.

In accordance with the invention, at least one of the guide elements which is moveable in a guide rail is set up as a lever and interacts with a forced stop of a linear movement of the guide element in such a way that the lever, particularly at the end of a closing movement, performs a pivoting movement. Accordingly, a windowpane fastened thereto may be pressed substantially perpendicularly to the guide rail against a window frame, in particular, against a seal. The movement of the windowpane in this case may exhibit both a component in the direction perpendicular to the linear guide and also execute a component along the linear guide and, in particular, even a pivoting movement.

In accordance with embodiments, the guide shaft of the first guide element may be positioned substantially perpendicular to the guide rail, and thus, is glideably moveable on the guide rail.

In accordance with embodiments, the linkage shaft may be oriented parallel to the guide shaft, and arranged spaced apart from the guide shaft and also from the guide rail. The linkage shaft may be fixed by a contact point of the drive mechanism to the first guide element. The linkage shaft may be a rotational shaft for the rotatable attachment of the drive mechanism to the first guide element.

In accordance with embodiments, the term "drive mechanism" may, in particular, be satisfied by a drive rod, but also, for example, by a cable drive or a cable hoist, which can likewise be operated electrically, hydraulically or manually in the same way as a rod or a linkage. The drive mechanism may therefore be driven electrically, hydraulically or manually, particularly via a drive rod which is movable via a gear rack driven by a motor and an associated gear wheel, for example, or via a cable drive or a cable hoist.

In accordance with embodiments, a stop for the first guide element and/or the second guide element may configured on the guide rail, so that through the stop the linear movement of the guide shaft in the guide rail is force-stopped. Particularly preferably, the stop may be formed by an end of the guide rail and push a guide element, particularly the upper guide element, against the stop during the initially linear closure and thereby terminate the linear movement and trigger the pivoting movement.

In accordance with embodiments, the guide rail may have a pivoting-connecting section on which a projecting extension is formed opposite the linear guide section, in which the extension is particularly configured in a circular-arc form or similar.

In accordance with embodiments, the pivoting-connecting section and the stop may be positioned on the guide rail in such a way that during a forced stop of the linear movement of the guide shaft in the guide rail by the stop and further drive via the drive mechanism in the same direction, against the stop, the first guide element performs a pivoting movement, during which the guide shaft of the guide element is guided in the pivoting-connecting section.

In accordance with embodiments, the first guide element may have a windowpane-fastening shaft for fastening the windowpane to the guide element, wherein the windowpane-fastening shaft is configured parallel to and spaced apart from the guide shaft and the linkage shaft. The windowpane-fastening shaft may be a rotational shaft for the rotatable connection of the windowpane to the first guide element.

In accordance with embodiments, the distance between the guide shaft and the linkage shaft may be less than the distance between the guide shaft from the windowpane-fastening shaft. In terms of cross-section, the first guide element may be Y-shaped, or V-shaped, or triangular.

In accordance with embodiments, the distance between the guide shaft from the stop may be substantially greater than the distance between the guide shaft from the linkage shaft and/or the windowpanes-fastening shaft.

In accordance with embodiments, the first guide element, and therefore, the lever element, may be the lower guide element of the two guide elements, particularly in the installation position. Alternatively, or additionally, the first guide element may be the lowest of a plurality of guide elements in the same guide rail, so that the lower region of a windowpane, in particular, may be pressed hard against the window frame or a seal.

In accordance with embodiments, the first guide element and/or the second guide element may comprise an attachment element configured to attach the guide element to the windowpane. The attachment element may be rotatably connected to the guide element, particularly, to the windowpane-fastening shaft.

In accordance with embodiments, the second guide element may be configured as a lever element, in the same way as the first guide element, and also otherwise comprise the aforementioned features in the same way as the first guide element and, in particular, be identical thereto in design. Alternatively, the second guide element may be configured as a single conductor which is guided, particularly completely, in the guide rail, so is guided linearly over its entire guide length.

In accordance with embodiments, in addition to the two aforementioned guide elements, further guide elements, particularly in the form of levers or conductors, may be guided in the guide rail.

In accordance with embodiments, the window regulator may comprise a further guide rail with a further first guide element and a second guide element. The further guide rail and its associated first guide element and second guide element may be identically configured to the at least one guide rail and the first guide element and the second guide element. Particularly, the drive mechanism may be connected to the first guide element and the other first guide element. Consequently, guide rails may, in particular, be provided on both sides of a windowpane for the guidance thereof.

In accordance with embodiments, a vehicle door may comprise at least one window regulator, as previously described, a window frame, and a windowpane, wherein the windowpane is fastened to the guide elements such that when in a closed state or position, is to execute a movement component perpendicular to the linear guide in the guide rail, so as to be pressed against the window frame.

In accordance with embodiments, a "vehicle door" may not only be a side door of a vehicle, but also a rear door, hatchback or tailgate of a vehicle.

In accordance with embodiments, the window frame may comprise a seal which may particularly run around the window frame and the windowpane is pressed against the seal when it is being closed.

In accordance with embodiments, the vehicle door may also contain an electric motor to actuate the drive mechanism.

DRAWINGS

Embodiments will be illustrated by way of example in the drawings and explained in the description below.

FIG. 3 illustrates a detail drawing of a vehicle door from the side with the windowpane in the closed position, in accordance with embodiments.

FIG. 4 illustrates a partial representation of FIG. 3 around the region of the first, lower guide element.

FIG. 5 illustrates a partial representation of FIG. 3 around the region of the second, upper guide element.

FIG. 6 illustrates a partial representation of FIG. 3 around the region of the seal at the bottom.

FIG. 7 illustrates a partial representation of FIG. 3 around the region of the seal at the top.

FIG. 8 illustrates a detail drawing of a vehicle door from the side with the windowpane in the open position, in accordance with embodiments.

FIG. 9 illustrates a partial representation of FIG. 8 around the region of the first, lower guide element.

FIG. 10 illustrates a partial representation of FIG. 8 around the region of the second, upper guide element.

DESCRIPTION

Figure 1:
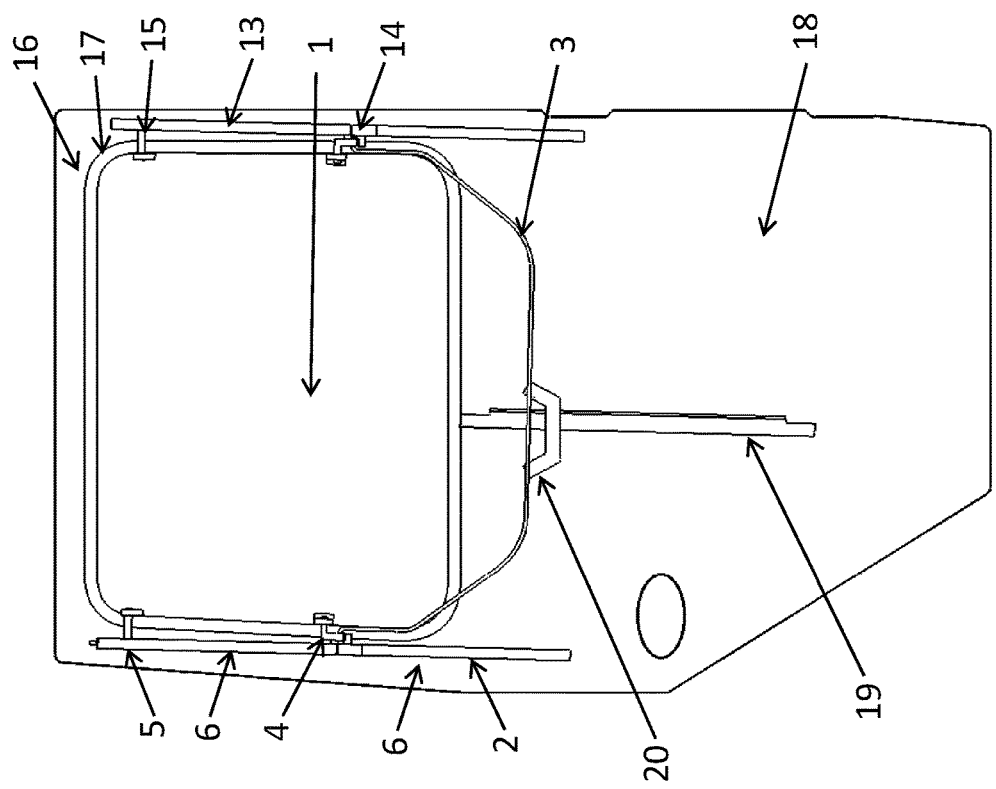
FIG. 1 illustrates a schematic view, from the front or from the inside of a vehicle, a vehicle door having a window regulator, in accordance with embodiments.

FIG. 1 illustrates, in accordance with embodiments, a vehicle door with a window regulator from the front or in the installed state in a vehicle from the inside. The vehicle door comprises an outer panel 18 with an opening for a windowpane 1 framed by a window frame 16, and a window regulator for raising and lowering the windowpane 1. The window regulator includes a first guide rail 2 for guiding the windowpane 1 on the left side of the windowpane 1 and a second guide rail 13 for guiding the windowpane 1 on the right side of the windowpane 1.

In the first guide rail 2, a first lower guide element 4 is guided as the lower guide element and a first upper guide element 5 as the upper guide element. Similarly to this, in the second guide rail 13, a second lower guide element 14 is guided as the lower guide element and a second upper guide element 15 as the upper guide element. All the guide elements 4, 5, 14, 15 are guided substantially linearly in a lower linear guide section 6 and an upper linear guide section 6 of the guide rails 2 and 13.

One a first side thereof, the windowpane 1 is fastened to the first lower guide element 4 and the first upper guide elements 5, and at a second side thereof is fastened to the second lower guide element 14 and the second upper guide element 15.

The first lower guide element 4 and the second lower guide element 13 are respectively moveable in an upward and downward direction by a drive mechanism 3. The drive mechanism 3 is configured as a rod, and is movable via a linkage receiver device 20 along a rail 19, preferably via a linear drive (not illustrated), for example, driven by an electric motor.

Figure 2:
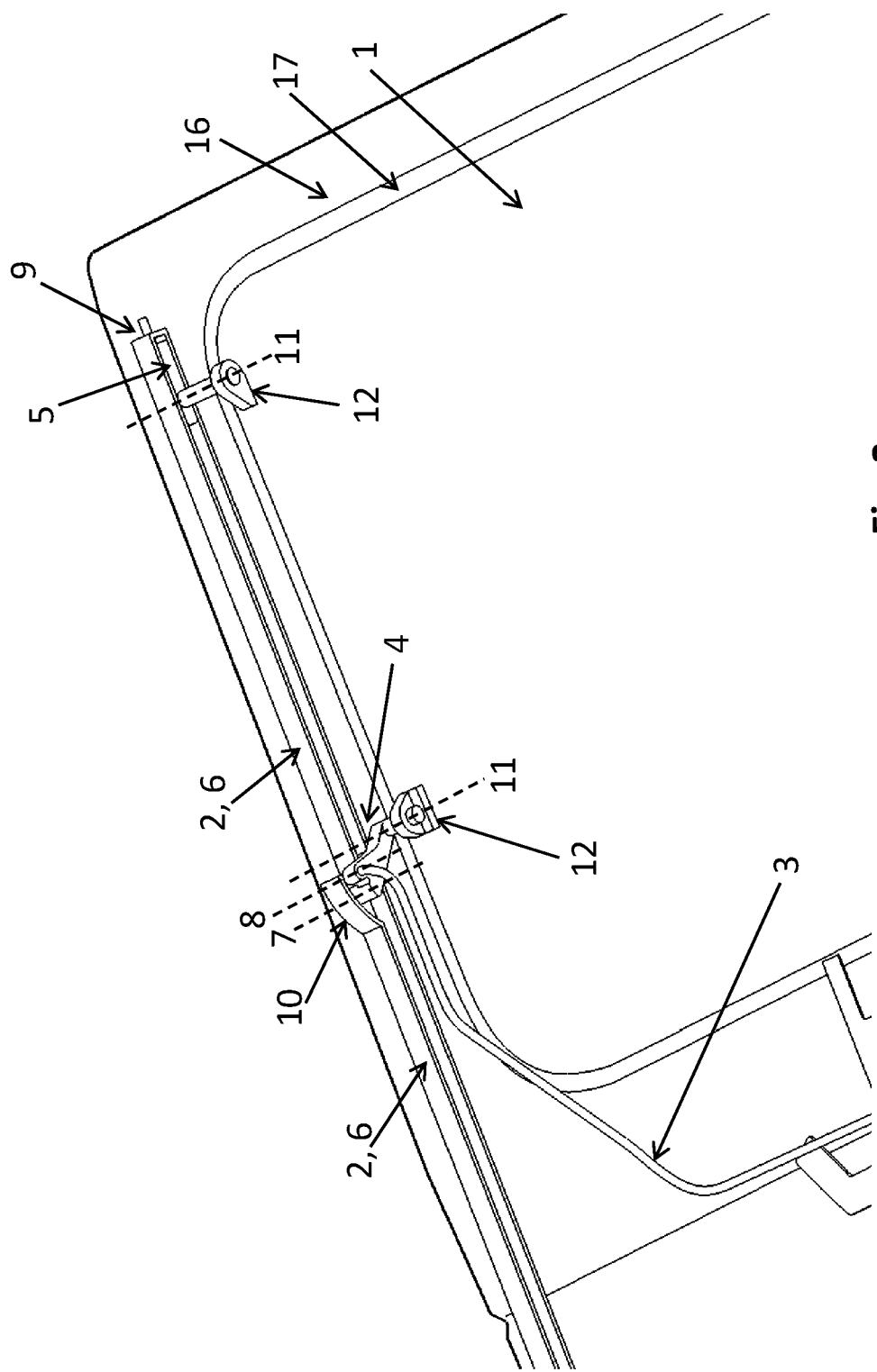
FIG. 2 illustrates a three-dimensional detail drawing of the upper left corner of the vehicle door of FIG. 1.
Figure 12:
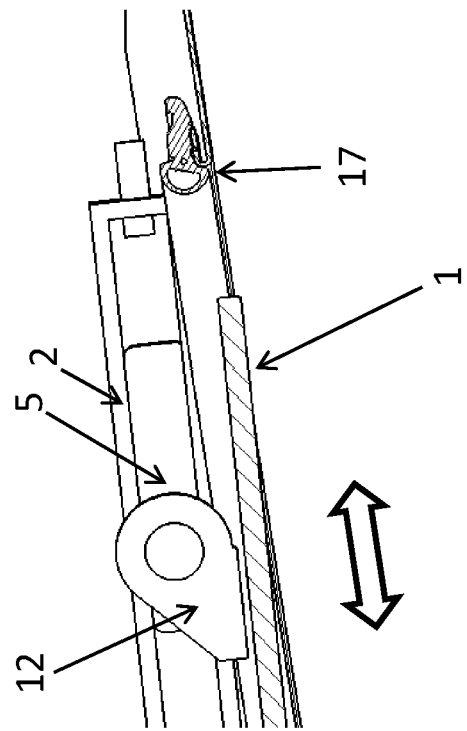
FIG. 12 illustrates a partial representation of FIG. 8 around the region of the seal at the top.

As illustrated in FIG. 2, the upper left corner of the vehicle door of FIG. 1 is depicted in greater detail in accordance with a first embodiment. The first lower guide element 4 and, similarly in each case, the second lower guide element 14, is configured as a lever element. The first lower guide element 4 has a guide shaft 7 which is formed by the shaft of a guide bolt, which is guided roughly perpendicularly to the first guide rail 2 laterally in the first guide rail 2.

The guide bolt and therefore the guide shaft 7 lie roughly horizontally in the installation position and therefore perpendicularly to the roughly vertically installed guide rail 2 and roughly parallel to the windowpane 1.

In addition, the first lower guide element 4 has a linkage shaft 8 spaced apart from the guide shaft 7 and parallel to the guide shaft 7, at which the drive mechanism 3 is rotatably connected to the first lower guide element 4. The linkage shaft 8 represents a rotational shaft for the attachment of the drive mechanism 3. The rod shaft 8 of the first lower guide element 4 is, at least during the linear movement of the first lower guide element 4, arranged spaced apart from the plane of the linear guide in the first guide rail 2 and the second guide rail 13, so offset relative to a plane which runs along the first guide rail 2 and therefore through the guide shaft 7, particularly offset relative to the side opposite the windowpane 1.

A stop 9 is configured at the upper end of the first guide rail 2 which creates a force stop for the first upper guide element 5. With a forced stop of the linear movement of the first upper guide element 5, through the connection thereof to the first lower guide element 4 via the windowpane 1, the first lower guide element 4 and, in particular, the guide shaft 7 thereof is force-stopped in its linear movement. As a result, during a further drive via the drive mechanism 3, the first lower guide element 4 performs a pivoting movement during which the linkage shaft 8 is pivoted upwardly and in the vehicle inwardly. In this way, an end of the first lower guide element 4 lying opposite the linkage shaft 8 and the windowpane 1 fastened there executes a movement component perpendicular to the linear guide in the first guide rail 2 and is pressed outwardly, in particular, against a circumferential seal 17 on the window frame 16.

As illustrated in FIGS. 3 and 4, in which the vehicle door of FIG. 2 is shown from the side with the windowpane 1 in the closed position. The first guide rail 2 has a pivoting-connecting section 10 which forms a projecting extension in respect of the linear guide section 6. The projection extension of the pivoting-connecting section 10 is configured as a circular arc, such as, for example, a circular arc which faces the inside of the vehicle.

FIG. 4 illustrates more accurately the region around the first lower guide element 4 in the vehicle door. FIG. 5 similarly illustrates the region around the first upper guide element 5.

The pivoting-connecting section 10 and the stop 9 are positioned on the first guide rail 2 in such a way that when the linear movement of the guide shaft 7 in the first guide rail 2 is stopped by the stop 9 and further drive via the drive mechanism 3, the first lower guide element 4 performs a pivoting movement, during which the guide shaft 7 is moved inwardly in the pivoting connection section 10. In this case, the end of the first lower guide element 4 opposite the pivoting-connecting section 10 is pivoted downwards and outwards and, in this way, the section of the windowpane 1 connected to this end of the lever is pivoted downwards and outwards. The linear movement of the first lower guide element 4 in the linear guide section 6 and also the pivoting movement in the pivoting connection section 10 are depicted as arrows in FIG. 4.

The first lower guide element 4 comprises at this aforementioned end a windowpane-fastening shaft 11 for the rotatable mounting of the windowpane 1. The windowpane-fastening shaft 11 is arranged parallel to and spaced apart from the guide shaft 7 and the linkage shaft 8.

As further illustrated in FIG. 4, the spatial distance between the guide shaft 7 and the linkage shaft 8 is less than the distance between the guide shaft 7 to the windowpane-fastening shaft 11. The first lower guide element 4 has a cross-section configured as a Y-shape overall, while the guide shaft 7 and the linkage shaft 8 are configured on the two legs of the Y and the windowpane-fastening shaft 11 on the single end of the Y.

The first lower guide element 4 and the first upper guide element 5 each comprise an attachment element 12 for the attachment of the first lower guide element 4 or the first upper guide element 5 to the windowpane 1. The attachment element 12 in each case is rotatably connected to the first lower guide element 4 or the first upper guide element 5 on the respective windowpane-fastening shaft 11.

The first upper guide element 5 is configured as a single conductor which is guided linearly in the first guide rail 2 until it reaches the stop 9, as indicated by an arrow in FIG. 5.

As illustrated in FIG. 6, a partial representation of FIG. 3 around the region of the seal 17 in the lower region of the window frame 16 is provided.

As illustrated in FIG. 7, provided is a partial representation of FIG. 3 around the region of the seal 17 at the top, with the windowpane 1 closed. In this case, the movement direction of the windowpane 1 during closing in the lower region of the windowpane 1 is a substantially horizontal movement (see arrow in FIG. 6), in the upper region of the windowpane 1, it is a vertical movement (arrow in FIG. 7).

Figure 11:
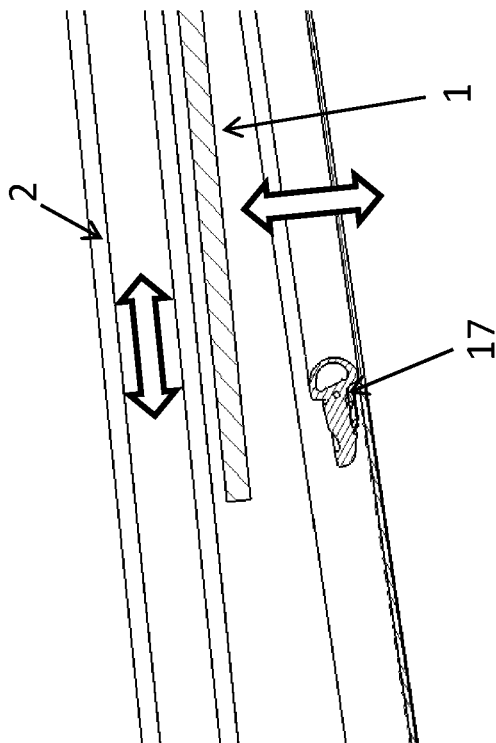
FIG. 11 illustrates a partial representation of FIG. 8 around the region of the seal at the bottom.

FIGS. 8 to 12 substantially correspond to FIGS. 3 to 7, but with the windowpane 1 in the open position. The first lower guide element 4 in this case runs in the linear guide of the first guide rail 2. The windowpane 1 in this case, as illustrated in FIG. 11, is raised from the seal 17.

Figure 13:
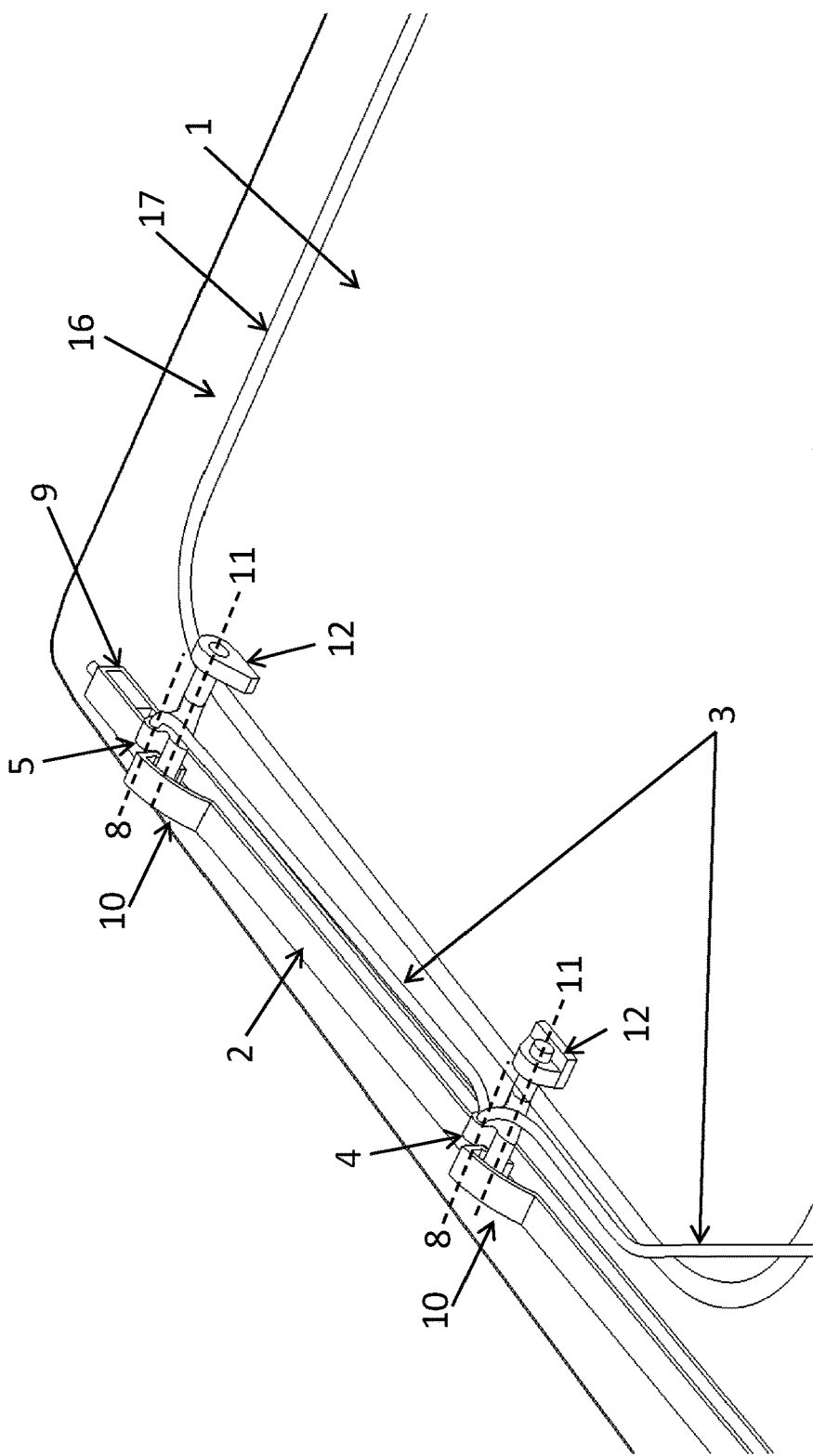
FIG. 13 illustrates a three-dimensional detail drawing of the upper left corner of the vehicle door of FIG. 1, in accordance with embodiments.

As illustrated in FIG. 13, in an alternative embodiment of the vehicle door or the window regulator, the first upper guide element 5, as with the first lower guide element 4, is configured as a lever element and exhibits the further features which have already been described for the first lower guide element 4. The first guide rail 2 and the second guide rail 13 each comprise two pivoting-connecting sections 10. The first upper guide element 5 may be guided in a corresponding pivoting-connecting section 10 assigned to it, and may also be stopped right at the stop 9.

The terms "coupled," "connected" "fastened" or "attached" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

LIST OF REFERENCE SIGNS 1 windowpane
2 first guide rail
3 drive mechanism
4 first lower guide element
5 first upper guide element
6 linear guide section
7 guide shaft
8 linkage shaft
9 stop
10 pivoting-connecting section
11 windowpane-fastening shaft
12 attachment element
13 second guide rail
14 second lower guide element
15 second upper guide element
16 window frame
17 seal
18 outer panel
19 rail
20 linkage receiver device

What is claimed is:

1. A window regulator for a windowpane of a motor vehicle and which is framed by a window frame, the window regulator comprising:
   at least one guide rail having a linear guide section;
   a lower guide element configured as a lever element to which the windowpane is fastened, the lower guide element being configured to be guided substantially linearly in the linear guide section in an upward and downward direction, the first lower guide element having a guide shaft to operatively connect the lower guide element to the at least one guide rail, a linkage shaft spaced apart from and parallel to the guide shaft, and a lower windowpane-fastening shaft arranged parallel to and spaced apart from the guide shaft and the linkage shaft to rotatably connect the lower guide element to the windowpane, wherein the guide shaft and the linkage shaft are arranged at a first end of the lower guide element and the lower windowpane-fastening shaft is arranged at a second end of the lower guide element;
   an upper guide element having an upper windowpane-fastening shaft to rotatably connect the upper guide element to the windowpane, the upper guide element being configured to be guided substantially linearly in the linear guide section; and
   a drive mechanism rotatably connected to the lower guide element via the linkage shaft such that during a forced stop of linear movement of the guide shaft, and a further drive via the drive mechanism, the lower guide element performs a pivoting movement about the linkage shaft so that the linkage shaft is pivoted upwardly and inwardly, and an end of the lower guide element and the windowpane executes a movement perpendicular to the linear guide section so that the windowpane is pressed outwardly against a circumferential seal on the window frame.

2. The window regulator of claim 1, further comprising a stop member arranged on the at least one guide rail for at least one of the lower guide element and the upper guide element, the stop member being configured to force stop the linear movement of the guide shaft in the at least one guide rail.

3. The window regulator of claim 2, wherein the at least one guide rail comprises a pivoting-connecting section which forms a projecting extension opposite the linear guide section.

4. The window regulator of claim 3, wherein the pivoting-connecting section and the stop member are positioned on the at least one guide rail such that during the forced stop of the linear movement of the guide shaft by the stop member, and the further drive via the drive mechanism, the lower guide element performs a pivoting movement during which the guide shaft is guided in the pivoting-connecting section.

5. The window regulator of claim 1, wherein a spatial distance between the guide shaft and the linkage shaft is less than the spatial distance between the guide shaft and the windowpane-fastening shaft.

6. The window regulator of claim 1, wherein the lower guide element comprises an attachment element rotatably connected to the first lower guide element via the lower windowpane-fastening shaft to attach the lower guide element to the windowpane.

7. The window regulator of claim 1, wherein the upper guide element comprises an attachment element rotatably connected to the upper guide element via the upper windowpane-fastening shaft, to attach the upper guide element to the windowpane.

8. The window regulator of claim 1, wherein:
   the lower guide element comprises a lower attachment element which is rotatably connected to the windowpane via the lower windowpane-fastening shaft; and
   the upper guide element comprises an upper attachment element which is rotatably connected to the windowpane via the upper windowpane-fastening shaft.

9. The window regulator of claim 1, wherein the upper guide element is guided completely in the at least one guide rail.

10. A door for a motor vehicle, comprising:
    a window frame having a circumferential seal;
    a windowpane framed by the window frame; and
    a window regulator configured to raise and lower the windowpane relative to the window frame, the window regulator including:
      at least one guide rail having a linear guide section;
      a lower guide element configured as a lever element to which the windowpane is fastened, the lower guide element being configured to be guided substantially linearly in the linear guide section in an upward and downward direction, the lower guide element having a guide shaft to operatively connect the lower guide element to the at least one guide rail, a linkage shaft spaced apart from and parallel to the guide shaft, and a lower windowpane-fastening shaft arranged parallel to and spaced apart from the guide shaft and the linkage shaft to rotatably connect the lower guide element to the windowpane, wherein the guide shaft and the linkage shaft are arranged at a first end of the lower guide element and the windowpane-fastening shaft is arranged at a second end of the lower guide element;
      an upper guide element having an upper windowpane-fastening shaft to rotatably connect the upper guide element to the windowpane, the upper guide element being configured to be guided substantially linearly in the linear guide section; and a drive mechanism rotatably connected to the lower guide element via the linkage shaft such that during a forced stop of a linear movement of the guide shaft in the guide rail, and a further drive via the drive mechanism, the lower guide element is configured to perform a pivoting movement about the linkage shaft so that the linkage shaft is pivoted upwardly and inwardly, and an end of the lower guide element and the windowpane executes a movement perpendicular to the linear guide section, so that the windowpane is pressed outwardly against the circumferential seal.

11. The vehicle door of claim 10, further comprising a stop member arranged on the at least one guide rail for at least one of the lower guide element and the upper guide element, the stop member being configured to force stop the linear movement of the guide shaft in the at least one guide rail.

12. The vehicle door of claim 11, wherein the at least one guide rail comprises a pivoting-connecting section which forms a projecting extension opposite the linear guide section.

13. The vehicle door of claim 12, wherein the pivoting-connecting section and the stop member are positioned on the at least one guide rail such that during the forced stop of the linear movement of the guide shaft by the stop member, and the further drive via the drive mechanism, the lower guide element performs a pivoting movement during which the guide shaft is guided in the pivoting-connecting section.

14. The vehicle door of claim 10, wherein a spatial distance between the guide shaft and the linkage shaft is less than the spatial distance between the guide shaft and the windowpane-fastening shaft.

15. The vehicle door of claim 10, wherein:
the lower guide element comprises a lower attachment element which is rotatably connected to the windowpane via the lower windowpane-fastening shaft; and
the upper guide element comprises an upper attachment element which is rotatably connected to the windowpane via the upper windowpane-fastening shaft.

16. A door for a motor vehicle, comprising:
a window frame;
a windowpane; and
a window regulator configured to raise and lower the windowpane relative to the window frame, the window regulator including a guide rail arranged on respective sides of the windowpane to thereby guide the windowpane, the guide rail having:
a linear guide section;
a lower guide element having a Y-shaped cross-section that includes a guide shaft extending from a first leg portion at a first end of the lower guide element to connect the lower guide element for movement in the linear guide section in an upward and downward direction, a linkage shaft extending from a second leg portion at the first end of the lower guide element, and a windowpane-fastening shaft extending from a third leg portion at a second end of the lower guide element to rotatably connect the lower guide element to the windowpane;
a first upper guide element having arranged spaced vertically apart from the lower guide element for movement in the linear guide section in an upward and downward direction, the first upper guide element having a windowpane-fastening shaft to rotatably connect the first upper guide element to the windowpane; and
a drive mechanism rotatably connected to the lower guide element via the linkage shaft such that during a forced stop of a linear movement of the guide shaft, and a further drive via the drive mechanism, the lower guide element is to perform a pivoting movement so that the linkage shaft is pivoted upwardly and inwardly, and the lower guide element and the windowpane are to execute a movement perpendicular to the linear guide section so that the windowpane is pressed outwardly against the window frame.

* * * * *